(12) United States Patent
Wheat et al.

(10) Patent No.: US 6,884,534 B2
(45) Date of Patent: Apr. 26, 2005

(54) ELECTRONIC BY-PASS CONTROL OF GAS AROUND THE HUMIDIFIER TO THE FUEL CELL STACK

(75) Inventors: William S. Wheat, Rochester, NY (US); Bruce J. Clingerman, Palmyra, NY (US); Matt K. Hortop, Rochester, NY (US)

(73) Assignee: General Motors Corporation, Detroit, MI (US)

( * ) Notice: Subject to any disclaimer, the term of this patent is extended or adjusted under 35 U.S.C. 154(b) by 441 days.

(21) Appl. No.: 09/848,509

(22) Filed: May 3, 2001

(65) Prior Publication Data

US 2002/0164509 A1 Nov. 7, 2002

(51) Int. Cl.[7] .................................................. H01M 8/04
(52) U.S. Cl. .............................. 429/24; 429/13; 429/26
(58) Field of Search ........................... 429/12, 13, 20, 429/22, 26, 19, 33, 34

(56) References Cited

U.S. PATENT DOCUMENTS

| | | |
|---|---|---|
| 5,935,725 A | 8/1999 | Dhar et al. |
| 5,952,119 A | 9/1999 | Wilson |
| 6,106,964 A * | 8/2000 | Voss et al. .................... 429/20 |
| 2001/0010872 A1 * | 8/2001 | Suzuki et al. ................. 429/12 |
| 2001/0010875 A1 * | 8/2001 | Katagiri et al. ............... 429/22 |
| 2001/0021468 A1 * | 9/2001 | Kanai et al. .................. 429/12 |

* cited by examiner

Primary Examiner—Michael Barr
Assistant Examiner—Monqiue Wills
(74) Attorney, Agent, or Firm—Harness, Dickey & Pierce, P.L.C.

(57) ABSTRACT

A humidity control system for a fuel cell stack includes a gas supply and a humidifier including an outlet and an inlet connected to the gas supply. A fuel cell stack includes an inlet that is connected to the outlet of the humidifier. A bypass line and a valve bypass gas around the humidifier to control the humidity of gas entering the fuel cell stack. The valve is located in the bypass line, between the gas supply and the humidifier, or between the humidifier and the fuel cell stack. The valve is a gas restriction valve, a throttle valve, or a directional valve. A humidity sensor generates a humidity signal based on humidity of gas entering the fuel cell stack. A controller connected to the humidity sensor and the valve controls the valve based on the humidity signal. The inlet of the fuel cell stack is one of a cathode flow line and an anode flow line of the fuel cell stack.

24 Claims, 4 Drawing Sheets

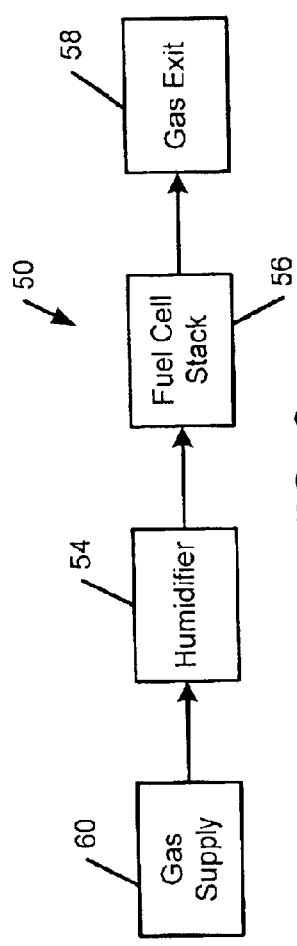
FIG. 2
_Prior Art_

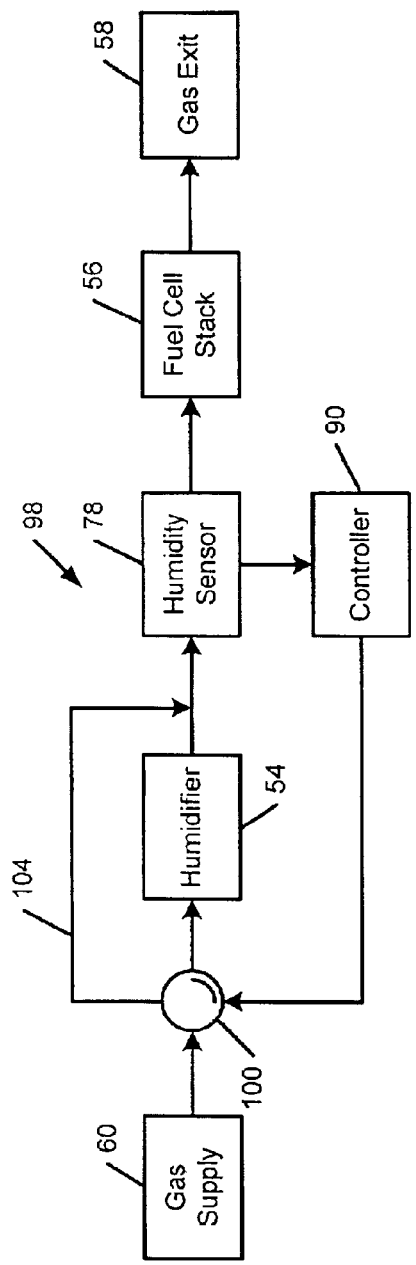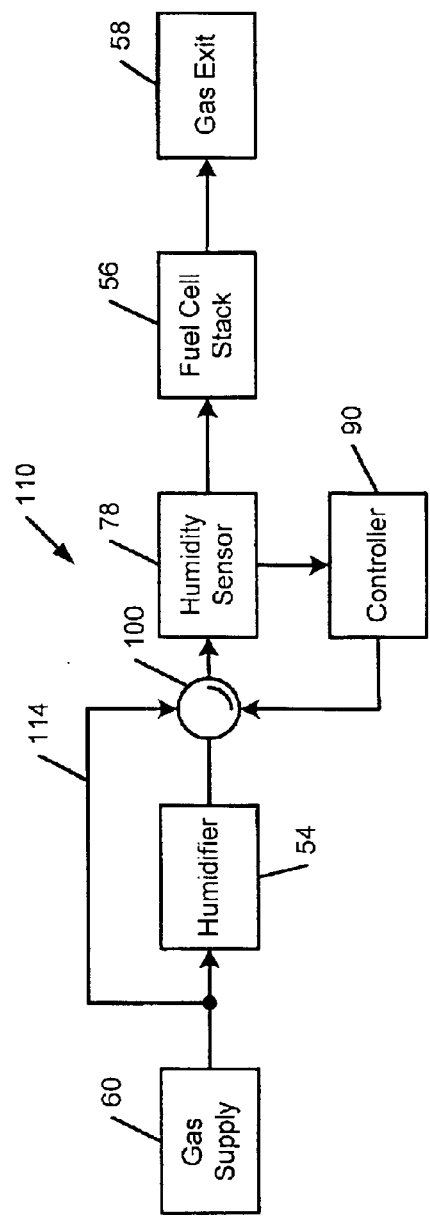

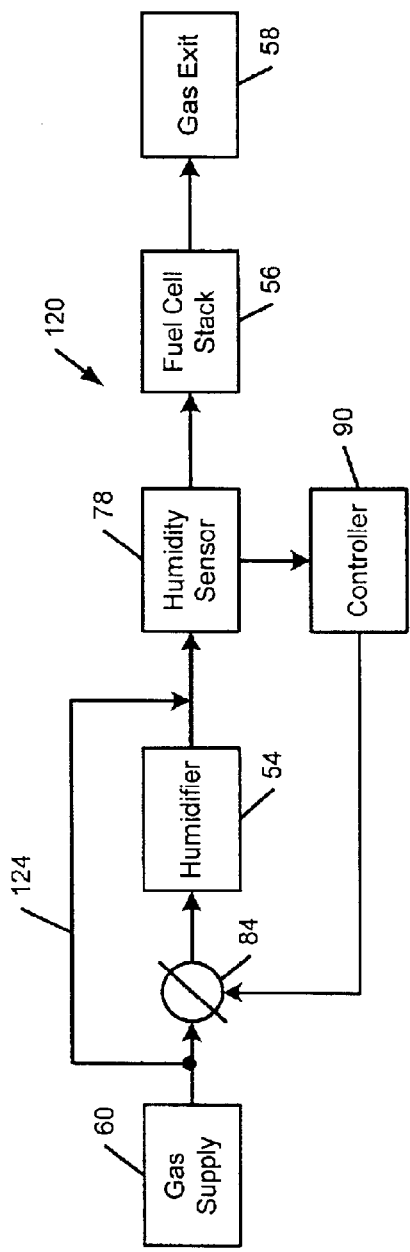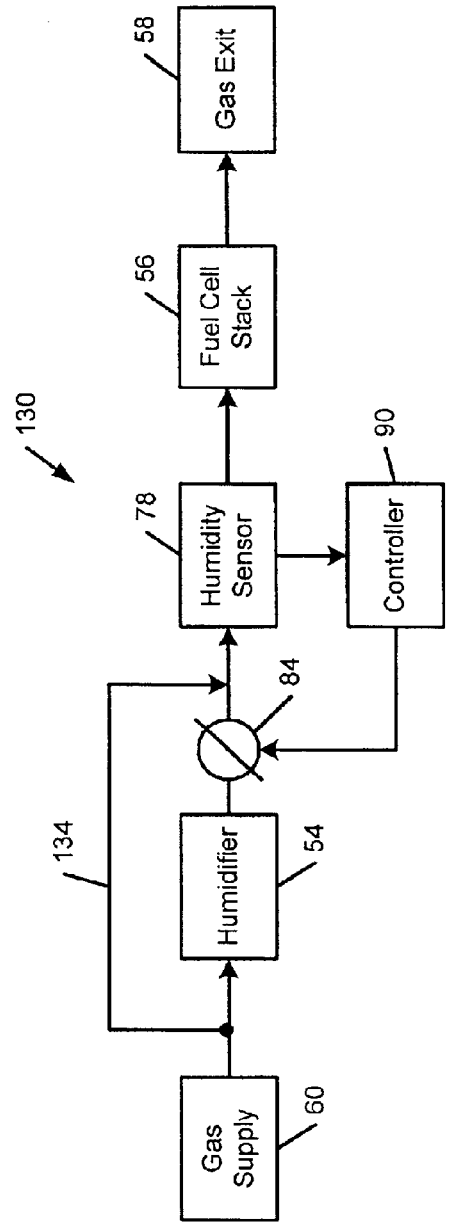
FIG. 5A
FIG. 5B

ELECTRONIC BY-PASS CONTROL OF GAS AROUND THE HUMIDIFIER TO THE FUEL CELL STACK

FIELD OF THE INVENTION

The present invention relates to a fuel cell systems and, more particularly, to a system and method for controlling relative humidity in a fuel cell stack.

BACKGROUND OF THE INVENTION

Fuel cell systems are increasingly being used as a power source in a wide variety of applications. Fuel cell systems have also been proposed for use in vehicles as a replacement for internal combustion engines. A solid-polymer-electrolyte fuel cell includes a membrane that is sandwiched between an anode and a cathode. To produce electricity through an electrochemical reaction, hydrogen ($H_2$) is supplied to the anode and oxygen ($O_2$) is supplied to the cathode. In some systems, the source of the hydrogen is reformate and the source of the oxygen ($O_2$) is air.

In a first half-cell reaction, dissociation of the hydrogen ($H_2$) at the anode generates hydrogen protons ($H^+$) and electrons ($e^-$). The membrane is proton conductive and dielectric. As a result, the protons are transported through the membrane while the electrons flow through an electrical load that is connected across the membrane. In a second half-cell reaction, oxygen ($O_2$) at the cathode reacts with protons ($H^+$), and electrons ($e^-$) are taken up to form water ($H_2O$).

To operate efficiently and to produce the maximum amount of electricity, the fuel cell must be properly humidified. To achieve the proper humidity range, the hydrogen stream and the oxygen stream are typically humidified by one of several methods known in the art. Conventional humidity control methods generally fail to sufficiently control the humidity of the hydrogen and the oxygen streams to the fuel cell. Providing too much humidity to the fuel cell blocks the reacting gases from accessing the catalyst thereby impeding the electrochemical reaction between the hydrogen and the oxygen and reducing the production of electricity. Providing too little humidity to the fuel cell restricts or limits the proton transportation required for reaction within the fuel cell and can also physically damage the fuel cell.

In some conventional fuel cell systems, the oxygen stream that is provided to the fuel cell is humidified as much as possible given the temperature of the oxygen and the humidifying water. These fuel cell systems are concerned with the prevention of dry oxygen that can potentially damage the fuel cell stack. The fuel cell systems are not concerned with the overly moist oxygen stream because it will not damage the fuel cell stack. While preventing damage, these fuel cell systems have less than optimum performance because the overly moist oxygen stream is not optimal for fuel cell performance. Therefore, a fuel cell system that prevents both a dry oxygen stream to the fuel cell and an overly moist oxygen stream to the fuel cell would be desirable.

SUMMARY OF THE INVENTION

A humidity control system for a fuel cell according to the invention includes a gas supply and a humidifier. An inlet of the humidifier is connected to the gas supply. A fuel cell includes an inlet that is connected to the outlet of the humidifier. A bypass line and a valve bypass gas around the humidifier to control the humidity of the gas entering the inlet of the fuel cell.

In other features of the invention, a humidity sensor generates a humidity signal based on the humidity of the gas entering the fuel cell. A controller connected to the humidity sensor and the valve controls the valve based on the humidity signal.

In still other features of the invention, the inlet of the fuel cell is one of a cathode flow line and an anode flow line of the fuel cell. The valve is located in the bypass line, between the gas supply and the humidifier, or between the humidifier and the fuel cell. The valve is preferably a gas restriction valve, a throttle valve, or a directional valve.

Still other objects, features and advantages will be readily apparent from the specification, the claims and the drawings.

BRIEF DESCRIPTION OF THE DRAWINGS

The various features and advantages of the present invention will become apparent to skilled artisans by referring to the following description and drawings in which:

FIG. 2 is a schematic block diagram illustrating a humidity control system for a fuel cell stack according to the prior art;

FIG. 4A is a schematic block diagram illustrating a second humidity control system for a fuel cell stack that includes a valve that is located between the gas supply and the humidifier;

FIG. 4B is a schematic block diagram illustrating a third humidity control system for a fuel cell stack that includes a valve that is located between the humidifier and the humidity sensor;

FIG. 5A is a schematic block diagram illustrating a fourth humidity control system for a fuel cell stack that includes a valve that is located between the gas supply and the humidifier; and FIG. 5B is a schematic block diagram illustrating a fifth humidity control system for a fuel cell stack that includes a valve that is located between the humidifier and the humidity sensor.

DETAILED DESCRIPTION OF THE PREFERRED EMBODIMENT

The ensuing detailed description provides preferred exemplary embodiments only and is not intended to limit the scope, applicability or configuration of the present invention. Rather, the ensuing detailed description of the preferred exemplary embodiments will provide those skilled in the art with an enabling description for implementing the preferred exemplary embodiments of the present invention. It being understood that various changes may be made in the function and arrangement of the elements without departing from the spirit and scope of the invention as set forth in the appended claims.

Figure 1:
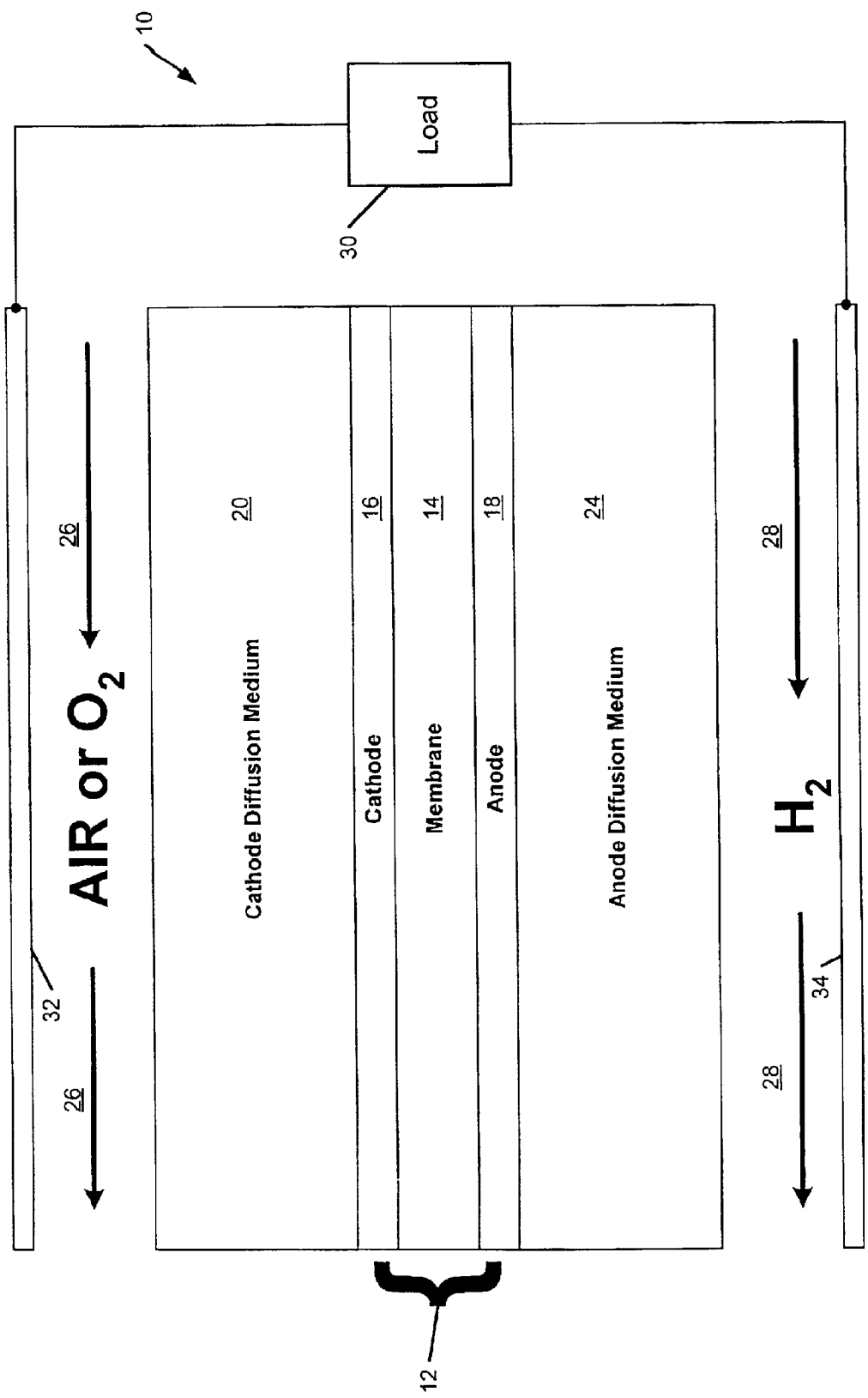
FIG. 1 illustrates a cross-section of a membrane electrode assembly of an exemplary fuel cell.

The humidity control system of the present invention employs a bypass line and a valve to bypass gas around the humidifier. Bypassing more gas reduces the humidity of the gas. Bypassing less gas increases the humidity of the gas. The humidity control system can adjust the humidity of an individual fuel cell or a fuel cell stack. The gas is hydrogen or reformate that is supplied to an anode flow line or air or oxygen that is supplied to a cathode flow line Referring now to FIG. 1, a cross-section of a fuel cell assembly 10 that includes a membrane electrode assembly (MEA) 12 is shown. Preferably, the membrane electrode assembly is a proton exchange membrane (PEM). The MEA 12 includes a membrane 14, a cathode 16, and an anode 18. The membrane 14 is sandwiched between an inner surface of the cathode 16 and an inner surface of the anode 18.

A cathode diffusion medium 20 is located adjacent to an outer surface of the cathode 16. An anode diffusion medium 24 is located adjacent to an outer surface of the anode 18. The fuel cell assembly 10 further includes a cathode flow line 26 and anode flow line 28. The cathode flow line 26 receives and directs oxygen ($O_2$) or air from a source to the cathode diffusion medium 20. The anode flow line 28 receives and directs hydrogen ($H_2$) or reformate from a source to the anode diffusion medium 24. For purposes of brevity the remaining discussion will refer to hydrogen ($H_2$) and oxygen ($O_2$). Skilled artisans will appreciate that reformate and air may also be employed.

In the fuel cell assembly 10, the membrane 14 is a cation permeable, proton conductive membrane having $H^+$ ions as the mobile ion. The fuel gas is hydrogen ($H_2$) and the oxidant is oxygen ($O_2$). The overall cell reaction is the oxidation of hydrogen to water and the respective reactions at the anode 18 and the cathode 16 are as follows:

$$H_2 = 2H^+ + 2e^-$$

$$0.5\ O_2 + 2H^+ + 2e^- = H_2O$$

Since hydrogen is used as the fuel gas, the product of the overall cell reaction is water. Typically, the water that is produced is rejected at the cathode 16, which is a porous electrode including an electrocatalyst layer on the oxygen side. The water may be collected as it is formed and carried away from the MEA 12 of the fuel cell assembly 10 in any conventional manner. The cell reaction produces a proton exchange in a direction from the anode diffusion medium 24 towards the cathode diffusion medium 20. In this manner, the fuel cell assembly 10 produces electricity. An electrical load 30 is electrically connected across the MEA 12 to a plate 32 and a plate 34. If the plates 32 and 34 are adjacent to another fuel cell, the plates 32 and/or 34 are bipolar. If another fuel cell is not adjacent, the plates 32 and/or 34 are end plates.

To operate efficiently and to produce the maximum amount of electricity, the fuel cell assembly 10 must be properly humidified. Typically, the oxygen stream supplied to the cathode flow line 26 and/or the hydrogen stream supplied to the anode flow line 28 are humidified by one of several ways known in the art. In a common approach, the anode and/or cathode gases are directed to a membrane humidifier before they are directed to the fuel cell. The humidifier may be either external to the fuel cell or it may comprise a section within the fuel cell stack. In another approach, the fuel cell can also be humidified via use of water wicking materials, as disclosed in U.S. Pat. Nos. 5,935,725 and 5,952,119, which are hereby incorporated by reference, that direct water from a reservoir to the MEA 12. Alternatively, steam or a mist of water ($H_2O$) may be injected into both the cathode stream and the anode stream to humidify them upstream of or within the fuel cell stack. In yet another approach, an oxygen stream may be injected in the hydrogen stream upstream of the anode flow line 28 to react with a small amount of hydrogen to produce water that humidifies the hydrogen stream. Likewise, a hydrogen stream may be injected into the oxygen stream to produce water that humidifies the oxygen stream.

Referring now to FIG. 2, the humidity control system 50 according to the prior art is illustrated and includes a humidifier 54 that humidifies gas flowing to the cathode flow line 26 and/or the anode flow line 28 of the fuel cell stack 56. A gas exit 58 of the fuel cell stack may be a flow line to a combustor (not shown) or other devices. The humidifier 54 increases the humidity of gas such as air, oxygen, hydrogen or reformate that are supplied by a gas supply 60. Gas is typically supplied to the gas supply 60 by a compressor (not shown). While the humidity control system 50 prevents dry gas from reaching the inlet of the fuel cell stack 56, the humidity control system 50 tends to provide an overly moist gas stream that reduces the performance of the fuel cell stack 56.

Figure 3:
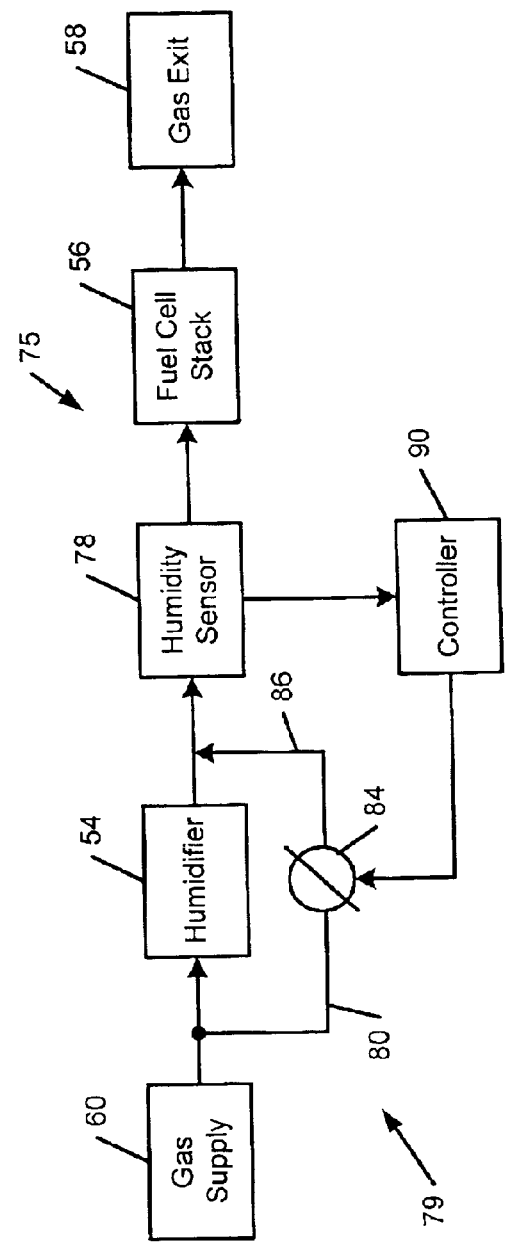
FIG. 3 is a schematic block diagram illustrating a first humidity control system for a fuel cell stack that includes a bypass line with a valve located in the bypass line.

Referring now to FIG. 3, reference numerals from FIG. 2 have been used where appropriate to identify similar elements. A humidity control system 75 according to the present invention further includes a humidity sensor 78 that measures the relative humidity of gas exiting the humidifier 54. Preferably, the humidity sensor 78 is a X112428-GT sold by Honeywell. Other types of humidity sensors may be employed. The humidity sensor 78 could also be a virtual sensor (software, not hardware). If the stack performance can be characterized to predict incoming gas humidity, the humidity could be calculated instead of directly measured. The humidity control system 75 may be used to control the humidity of air or oxygen to the cathode flow line 26 or hydrogen or reformate to the anode flow line 28. A gas bypass includes a bypass line 80 having one end that is connected to a valve 84. An opposite end of the bypass line 80 is connected between the gas supply 60 and the inlet of the humidifier 54. The valve 84 is also connected to one end of a bypass line 86. An opposite end of the bypass line 86 is connected between the outlet of the humidifier 54 and the humidity sensor 78. A humidity controller 90 is connected to the humidity sensor 78 and to the valve 84. The humidity controller 90 can be an electronic circuit that varies the position of the valve 84 based on the humidity signal, an application specific integrated circuit (ASIC), an off-the-shelf controller running software, or any other suitable control circuit. Preferably, the valve 84 is a gas restriction valve. In a highly preferred embodiment, the valve 84 is similar to a conventional throttle valve employed in internal combustion engines.

When the humidity that is sensed by the humidity sensor 78 exceeds a first predetermined level or falls below a second predetermined level, the portion of the gas is bypassed is varied using the gas bypass. By controlling the valve 84, the amount of gas that is bypassed can be controlled. The method of control will be dependent upon the size of the lines, the characteristics of the humidifier 54 and the characteristics of the valve 84. In general, the longer or wider that the valve 84 is open, the more gas bypasses the humidifier 54 and is not humidified. By employing mass-production, highly-developed gas restriction or throttle valves such as those used in internal combustion engines, the humidity control system 75 is less expensive and more reliable. Additionally, placement of the valve 84 in the gas bypass allows for fail-safe operation. In other words, if the valve 84 fails, gas flows through the humidifier 54. While a dry gas stream is dangerous for the fuel cell stack 56, an overly moist gas stream reduces system performance but will not harm the fuel cell stack 56.

Referring now to FIG. 4A, reference numerals from FIG. 3 have been used where appropriate to identify similar elements. An alternate humidity control system 98 for the fuel cell stack 56 is shown. A valve 100 is positioned between the gas supply 60 and the inlet of the humidifier 54. Preferably, the valve 100 is a directional valve. One end of a bypass line 104 is connected to the valve 100. An opposite end of the bypass line 104 is connected between the humidifier 54 and the humidity sensor 78. The controller 90 is connected to the humidity sensor 78 and the valve 100. The principal of operation of the alternate humidity control system 98 is similar to that described above in conjunction with FIG. 3. However, instead of restricting gas flow, the valve 100 directs air between two different paths. One path flows through the humidifier 54, the humidity sensor 78 and the fuel cell stack 56. Another path flows around the humidifier 54 and through the humidity sensor 78 and the fuel cell stack 56. By controlling the amount of gas flowing in the two paths, the humidity of the gas is controlled.

Referring now to FIG. 4B, reference numerals from FIG. 4A have been used where appropriate to identify similar elements. An alternate humidity control system 110 for the fuel cell stack 56 is shown. The valve 100 is positioned between the humidifier 54 and the humidity sensor 78. One end of a bypass line 114 is connected to the valve 100. An opposite end of the bypass line 114 is connected between the gas supply 60 and the inlet of the humidifier 54. The controller 90 is connected to the humidity sensor 78 and the valve 100. The principal of operation of the alternate humidity control system 110 is similar to that described above in conjunction with FIG. 4A.

Referring now to FIG. 5A, reference numerals from FIG. 3 have been used where appropriate to identify similar elements. An alternate humidity control system 120 for the fuel cell stack 56 is shown. The valve 84 is positioned between the gas supply 60 and the inlet of the humidifier 54. One end of a bypass line 124 is connected to between the gas supply 60 and the valve 84. An opposite end of the bypass line 124 is connected between the outlet of the humidifier 54 and the humidity sensor 78. The controller 90 is connected to the humidity sensor 78 and the valve 84. The principal of operation of the alternate humidity control system 120 is similar to that described above in conjunction with FIG. 3.

Referring now to FIG. 5B, reference numerals from FIG. 3 have been used where appropriate to identify similar elements. An alternate humidity control system 130 for the fuel cell stack 56 is shown. The valve 84 is positioned between the outlet of the humidifier 54 and the humidity sensor 78. One end of a bypass line 134 is connected between the gas supply 60 and the inlet of the humidifier 54. An opposite end of the bypass line 134 is connected between the valve 84 and the humidity sensor 78. The controller 90 is connected to the humidity sensor 78 and the valve 84. The principal of operation of the alternate humidity control system 98 is similar to that described above in conjunction with FIG. 3.

Use of the bypass lines and valves according to the present invention to vary the humidity of gas that is supplied to the anode and cathode flow lines provides many significant benefits. Bypassing gas around the humidifier provides active control over the relative humidity levels of the gases. Controlling the humidification reduces the amount of make-up water that is required throughout the fuel cell system. The humidity control system according to the invention allows for a smaller radiator by controlling humidity levels. In other words, the fuel cell system needs to be water neutral. By over-humidifying the gas flow, more water needs to be recovered using condensers. To condense more water, more vehicle coolant will absorb more energy at the condensers. The vehicle coolant will therefore also need to reject more energy at the radiator. As a result, a larger radiator will be required.

Bypassing the humidifier also provides a lower change in pressure (ΔP) than would otherwise be experienced. Lower flow rates through the humidifier allow lower working pressures. Flexibility in humidifier design is provided by the lower ΔP. This flexibility generally translates into smaller and lower-cost humidifiers.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A humidity control system for a fuel cell stack, comprising:

a gas supply;

a humidifier including an inlet connected to said gas supply and an outlet;

a fuel cell stack including an inlet that is connected to said outlet of said humidifier;

a bypass line having one end connected between said gas supply and said humidifier and an opposite end connected between said outlet of said humidifier and said inlet of said fuel cell stack; and a valve located in said bypass line, wherein said valve is one of a gas restriction valve and a throttle valve.

2. A humidity control system for a fuel cell stack, comprising:

a gas supply;

a humidifier including an inlet connected to said gas supply and an outlet;

a fuel cell stack including an inlet that is connected to said outlet of said humidifier;

a bypass line having one end connected between said gas supply and said humidifier and an opposite end connected between said outlet of said humidifier and said inlet of said fuel cell stack; and a proportional valve located in said bypass line, said proportional valve being openable at a plurality of positions including a fully open position, a fully closed position, and a plurality of intermediate partially closed positions.

wherein said proportional valve controls the proportion of gas flowing from said gas supply through said humidifier to said fuel cell stack and through said bypass line to said fuel cell stack.

3. A humidity control system for a fuel cell stack, comprising:

a gas supply;

a humidifier including an inlet connected to said gas supply and an outlet;

a fuel cell stack including an inlet that is connected to said outlet of said humidifier;

a bypass line having one end connected between said gas supply and said humidifier and an opposite end connected between said outlet of said humidifier and said inlet of said fuel cell stack;

a valve located in said bypass line;

a humidity sensor for generating a humidity signal based on the humidity of gas entering said fuel cell stack; and a controller connected to said humidity sensor and said valve for controlling said valve based on said humidity signal.

4. The humidity control system of claim 2, wherein said inlet of said fuel cell stack is one of a cathode flow line and an anode flow line of said fuel cell stack.

5. A humidity control system for a fuel cell stack, comprising:

a gas supply;

a humidifier including an inlet connected to said gas supply and an outlet;

a fuel cell stack including an inlet that is connected to said outlet of said humidifier; a proportional valve located between said gas supply and said inlet of said humidifier, said proportional valve being openable at a plurality of positions including a fully open position, a fully closed position, and a plurality of intermediate partially closed positions; and a bypass line having one end connected to said proportional valve and an opposite end connected between said outlet of said humidifier and said inlet of said fuel cell stack, wherein said proportional valve controls the proportion of gas flowing from said gas supply through said humidifier to said fuel cell stack and through said bypass line to said fuel cell stack.

6. The humidity control system of claim 5 wherein said valve is a directional valve.

7. A humidity control system for a fuel cell stack, comprising:

a gas supply;

a humidifier including an inlet connected to said gas supply and an outlet;

a fuel cell stack including an inlet that is connected to said outlet of said humidifier;

a valve located between said gas supply and said inlet of said humidifier;

a bypass line having one end connected to said valve and an opposite end connected between said outlet of said humidifier and said inlet of said fuel cell stack;

a humidity sensor for generating a humidity signal based on the humidity of gas entering said fuel cell stack; and a controller connected to said humidity sensor and said valve for controlling said valve based on said humidity signal.

8. The humidity control system of claim 7 wherein inlet of said fuel cell stack is one of a cathode flow line and an anode flow line of said fuel cell stack.

9. A humidity control system for a fuel cell stack, comprising:

a gas supply;

a humidifier including an inlet connected to said gas supply and an outlet;

a fuel cell stack including an inlet that is connected to said outlet of said humidifier;

a proportional valve located between said outlet of said humidifier and said inlet of said fuel cell stack, said proportional valve being openable at a plurality of positions including a fully open position, a fully closed position, and a plurality of intermediate partially closed positions; and a bypass line having one end connected to said proportional valve and an opposite end connected between said gas supply and said inlet of said humidifier, wherein said proportional valve controls the proportion of gas flowing from said gas supply through said humidifier to said fuel cell stack and through said bypass line to said fuel cell stack.

10. The humidity control system of claim 9 wherein said valve is a directional valve.

11. A humidity control system for a fuel cell stack, comprising:

a gas supply;

a humidifier including an inlet connected to said gas supply and an outlet;

a fuel cell stack including an inlet that is connected to said outlet of said humidifier;

a valve located between said outlet of said humidifier and said inlet of said fuel cell stack;

a bypass line having one end connected to said valve and an opposite end connected between said gas supply and said inlet of said humidifier;

a humidity sensor for generating a humidity signal based on the humidity of gas entering said fuel cell stack; and a controller connected to said humidity sensor and said valve for controlling said valve based on said humidity signal.

12. The humidity control system of claim 11 wherein said inlet of said fuel cell stack is one of a cathode flow line and an anode flow line of said fuel cell stack.

13. A humidity control system for a fuel cell stack, comprising:

a gas supply;

a humidifier including an inlet connected to said gas supply and an outlet;

a fuel cell stack including a stack inlet that is connected to said outlet of said humidifier;

a valve located between said gas supply and said inlet of said humidifier; and a bypass line having one end connected between said gas supply and said valve and an opposite end connected between said outlet of said humidifier and said stack inlet, wherein said valve is one of an air restriction valve and a throttle valve.

14. A humidity control system for a fuel cell stack, comprising:

a gas supply;

a humidifier including an inlet connected to said gas supply and an outlet;

a fuel cell stack including a stack inlet that is connected to said outlet of said humidifier;

a proportional valve located between said gas supply and said inlet of said humidifier, said proportional valve being openable at a plurality of positions including a fully open position, a fully closed position, and a plurality of intermediate partially closed positions; and a bypass line having one end connected between said gas supply and said proportional valve and an opposite end connected between said outlet of said humidifier and said stack inlet, wherein said proportional valve controls the proportion of gas flowing from said gas supply through said humidifier to said fuel cell stack and through said bypass line to said fuel cell stack.

15. A humidity control system for a fuel cell stack, comprising:
- a gas supply;
- a humidifier including an inlet connected to said gas supply and an outlet;
- a fuel cell stack including a stack inlet that is connected to said outlet of said humidifier;
- a valve located between said gas supply and said inlet of said humidifier;
- a bypass line having one end connected between said gas supply and said valve and an opposite end connected between said outlet of said humidifier and said stack inlet;
- a humidity sensor for generating a humidity signal based on the humidity of gas entering said fuel cell stack; and
- a controller connected to said humidity sensor and said valve for controlling said valve based on said humidity signal.

16. The humidity control system of claim 15 wherein said stack inlet is one of a cathode flow line and an anode flow line of said fuel cell stack.

17. A humidity control system for a fuel cell stack, comprising:
- a gas supply;
- a humidifier including an inlet connected to said gas supply and an outlet;
- a fuel cell stack including an inlet that is connected to said outlet of said humidifier;
- a valve located between said outlet of said humidifier and said inlet of said fuel cell stack; and
- a bypass line having one end connected between said valve and said inlet of said fuel cell stack and an opposite end connected between said gas supply and said inlet of said humidifier;
- wherein said valve is one of an air restriction valve and a throttle valve.

18. A humidity control system for a fuel cell stack, comprising:
- a gas supply;
- a humidifier including an inlet connected to said gas supply and an outlet;
- a fuel cell stack including an inlet that is connected to said outlet of said humidifier:
- a proportional valve located between said outlet of said humidifier and said inlet of said fuel cell stack, said proportional valve being openable at a plurality of positions including a fully open position, a fully closed position, and a plurality of intermediate partially closed positions; and
- a bypass line having one end connected between said proportional valve and said inlet of said fuel cell stack and an opposite end connected between said gas supply and said inlet of said humidifier;
- wherein said proportional valve controls the proportion of gas flowing from said gas supply through said humidifier to said fuel cell stack and through said bypass line to said fuel cell stack.

19. A humidity control system for a fuel cell stack, comprising:
- a gas supply;
- a humidifier including an inlet connected to said gas supply and an outlet;
- a fuel cell stack including an inlet that is connected to said outlet of said humidifier;
- a valve located between said outlet of said humidifier and said inlet of said fuel cell stack; and
- a bypass line having one end connected between said valve and said inlet of said fuel cell stack and an opposite end connected between said gas supply and said inlet of said humidifier; wherein said valve is one of an air restriction valve and a throttle valve;
- a humidity sensor for generating a humidity signal based on the humidity of gas entering said fuel cell stack; and
- a controller connected to said humidity sensor and said valve for controlling said valve based on said humidity signal.

20. The humidity control system of claim 19 wherein said inlet of said fuel cell stack is one of a cathode flow line and an anode flow line of said fuel cell stack.

21. The humidity control system of claim 3 wherein said inlet of said fuel cell stack is one of a cathode flow line and an anode flow line of said fuel cell stack.

22. The humidity control system of claim 5 wherein inlet of said fuel cell stack is one of a cathode flow line and an anode flow line of said fuel cell stack.

23. The humidity control system of claim 9 wherein said inlet of said fuel cell stack is one of a cathode flow line and an anode flow line of said fuel cell stack.

24. The humidity control system of claim 14 wherein said stack inlet is one of a cathode flow line and an anode flow line of said fuel cell stack.

* * * * *